(12) United States Patent
You et al.

(10) Patent No.: US 12,122,218 B2
(45) Date of Patent: Oct. 22, 2024

(54) HEAT MANAGEMENT SYSTEM

(71) Applicant: Hanon Systems, Daejeon (KR)

(72) Inventors: Jae-Chun You, Daejeon (KR); Yochan Min, Daejeon (KR); Yun Sub Chung, Daejeon (KR)

(73) Assignee: Hanon Systems, Daejeon (KR)

(*) Notice: Subject to any disclaimer, the term of this patent is extended or adjusted under 35 U.S.C. 154(b) by 0 days.

(21) Appl. No.: 18/027,185

(22) PCT Filed: Nov. 1, 2021

(86) PCT No.: PCT/KR2021/015568
§ 371 (c)(1),
(2) Date: Mar. 20, 2023

(87) PCT Pub. No.: WO2022/114563
PCT Pub. Date: Jun. 2, 2022

(65) Prior Publication Data
US 2023/0373271 A1    Nov. 23, 2023

(30) Foreign Application Priority Data
Nov. 26, 2020    (KR) .................. 10-2020-0160712

(51) Int. Cl.
*B60H 1/14*    (2006.01)
*B60H 1/00*    (2006.01)
*B60H 1/32*    (2006.01)

(52) U.S. Cl.
CPC ......... *B60H 1/143* (2013.01); *B60H 1/00571* (2013.01); *B60H 1/3227* (2013.01)

(58) Field of Classification Search
CPC .. B60H 1/143; B60H 1/3227; B60H 1/00571; B60H 1/00485; B60H 1/3229; B60H 1/0278; B60Y 2200/91; B60Y 2304/072
See application file for complete search history.

(56) References Cited

U.S. PATENT DOCUMENTS

2008/0127666 A1    6/2008  Major et al.
2021/0053415 A1*   2/2021  Oh ..................... B60H 1/00571
(Continued)

FOREIGN PATENT DOCUMENTS

DE    11 2012 001 744 A1    2/2020
DE    10 2018 217 396 A1    4/2020
(Continued)

OTHER PUBLICATIONS

Office Action issued on Jul. 11, 2024 by the German Patent Office in the corresponding Patent Application No. DE 11 2021 004 520.2, with English translation.

*Primary Examiner* — Marc E Norman
(74) *Attorney, Agent, or Firm* — Norton Rose Fulbright US LLP; James R. Crawford

(57) ABSTRACT

The present invention relates to a heat management system having performance improved by reducing a distance between components constituting a refrigerant module and minimizing a pressure loss of a refrigerant, the heat management system including: a first heat exchanger heat-exchanging a heat exchange medium flowing thereinto from a compressor; a first expansion valve expanding the heat exchange medium flowing thereinto from the first heat exchanger and transferring the expanded heat exchange medium to a condenser; a second expansion valve expanding the heat exchange medium flowing thereinto from the condenser; a second heat exchanger heat-exchanging the heat exchange medium flowing thereinto from the second expansion valve with a heat-generating component; an accumulator storing the heat exchange medium flowing thereinto from the second heat exchanger; and an internal heat exchanger heat-exchanging the heat exchange medium discharged from the condenser with a heat exchange medium discharged from an evaporator.

18 Claims, 11 Drawing Sheets

(56) References Cited

U.S. PATENT DOCUMENTS

2022/0105784 A1\* 4/2022 Yahia .................... F25B 40/02
2022/0144039 A1\* 5/2022 Benouali ............ B60H 1/00921
2022/0288998 A1\* 9/2022 Hwang ................ B60H 1/3229

FOREIGN PATENT DOCUMENTS

| JP | 2019-533797 A | 11/2019 |
|---|---|---|
| KR | 2014-0147365 A | 12/2014 |
| KR | 10-2019-0002878 A | 1/2019 |
| KR | 10-2019-0057770 A | 5/2019 |
| KR | 10-2020-0086494 A | 7/2020 |
| WO | 2020/246791 A1 | 12/2020 |

\* cited by examiner

HEAT MANAGEMENT SYSTEM

CROSS REFERENCE TO RELATED APPLICATIONS

This application is a national phase under 35 U.S.C. § 371 of International Application No. PCT/KR2021/015568 filed on Nov. 1, 2021, which claims the benefit of priority from Korean Patent Application No. 10-2020-0160712 filed on Nov. 26, 2020. The entire contents of these applications are incorporated herein by reference in their entirety.

TECHNICAL FIELD

The present invention relates to a heat management system in which components constituting a refrigerant system for cooling a vehicle and cooling an electronic component are modularized.

BACKGROUND ART

Recently, an electric vehicle has been spotlighted in the field of automobiles to implement an environmentally friendly technology and as a solution to a problem such as energy depletion.

The electric vehicle travels using a motor driven by receiving power from a battery or a fuel cell, causing low carbon emissions and low noise. Furthermore, the electric vehicle is environmentally friendly because the motor used therein is more energy-efficient than conventional engines.

Such an electric vehicle includes a heat management system for cooling or heating an indoor side of the vehicle for the air-conditioning purposes and for cooling electronic components such as a driving motor, a battery, and an inverter.

The heat management system includes a refrigerant system for cooling the indoor side of the vehicle and for cooling electrical components. However, the refrigerant system requires a large number of components for circulating a refrigerant and a large number of pipes connecting them, and thus, a process of assembling the refrigerant system is complicated and difficult. In addition, the pipes connecting the components to each other are long, resulting in a pressure drop of refrigerant flowing therein, which causes a performance loss in the system.

RELATED ART DOCUMENT

Patent Document

KR 2014-0147365 A (Dec. 30, 2014)

DISCLOSURE

Technical Problem

An object of the present invention is to provide a heat management system in which a distance between components constituting a cooling system for cooling an indoor side of a vehicle and cooling an electronic component is reduced to reduce a pressure loss of a refrigerant in a pipe and a block connecting the components to each other, thereby improving the performance of the system, and to improve assemblability.

Technical Solution

In one general aspect, a heat management system includes: a first heat exchanger heat-exchanging a heat exchange medium flowing thereinto from a compressor; a first expansion valve expanding the heat exchange medium flowing thereinto from the first heat exchanger and transferring the expanded heat exchange medium to a condenser; a second expansion valve expanding the heat exchange medium flowing thereinto from the condenser; a second heat exchanger heat-exchanging the heat exchange medium flowing thereinto from the second expansion valve with a heat-generating component; an accumulator storing the heat exchange medium flowing thereinto from the second heat exchanger and supplying the heat exchange medium to the compressor; and an internal heat exchanger heat-exchanging the heat exchange medium discharged from the condenser with a heat exchange medium discharged from an evaporator.

The heat-generating component may include a battery or an electronic component, and the second heat exchanger may cool or heat the heat-generating component.

The first heat exchanger, the first expansion valve, the second expansion valve, the second heat exchanger, the accumulator, and the internal heat exchanger may be modularized and integrally formed.

The second expansion valve and the internal heat exchanger may be disposed above the second heat exchanger in a height direction.

The accumulator may be disposed below the second heat exchanger in the height direction.

The second heat exchanger may have a heat exchange medium inlet formed at an upper portion thereof in the height direction, and a heat exchange medium outlet formed at a lower portion thereof in the height direction.

The heat management system may further include a first connection block connecting a heat exchange medium outlet of the condenser and a heat exchange medium inlet of the second expansion valve to each other, and connecting the heat exchange medium outlet of the condenser and a heat exchange medium inlet of the internal heat exchanger to each other.

The heat management system may further include a second connection block connecting a heat exchange medium outlet of the second expansion valve and a heat exchange medium inlet of the second heat exchanger to each other, and connecting a heat exchange medium outlet of the second heat exchanger and a heat exchange medium inlet of the accumulator to each other.

The second connection block may be disposed opposite to the first connection block based on the second expansion valve, and a flow path from a heat exchange medium inlet of the first connection block connected to the condenser to a heat exchange medium inlet of the second connection block connected to the second expansion valve may be formed in a straight line.

A pair of heat exchange medium outlets of the first connection block may be located at the same height.

All of a heat exchange medium outlet of the first heat exchanger, a heat exchange medium inlet of the second expansion valve, and one heat exchange medium inlet and the other heat exchange medium outlet of the internal heat exchanger may be formed on the same side.

The heat management system may further include connection pipes connected to the first heat exchanger, the first expansion valve, the second expansion valve, the second heat exchanger, and the internal heat exchanger, respectively, wherein the connection pipes are formed to extend in the same direction, such that end portions thereof are located within a specific region.

The heat management system may further include: a condenser cooling the heat exchange medium flowing thereinto from the first expansion valve by exchanging heat with air and transferring the cooled heat exchange medium to the second expansion valve; and an air conditioning device cooling and heating an indoor side, wherein the condenser is an air-cooled condenser, and the air-cooled condenser is mounted on the air conditioning device.

The heat management system may further include: a third expansion valve expanding the heat exchange medium flowing thereinto from the condenser; and an evaporator heat-exchanging the heat exchange medium flowing thereinto from the third expansion valve with air to be supplied indoors, and then transferring the heat exchange medium to the accumulator.

The heat management system may further include an indoor unit connected between the compressor and the first heat exchanger, and heat-exchanging the heat exchange medium flowing thereinto from the compressor with air to be supplied indoors and then transferring the heat exchange medium to the first heat exchanger.

In another general aspect, a refrigerant module includes: a first condenser heat-exchanging a heat exchange medium flowing thereinto from a compressor; a first expansion valve disposed beside a side surface of the first condenser, and expanding the heat exchange medium flowing thereinto from the first condenser and transferring the expanded heat exchange medium to a second condenser; a battery chiller disposed beside a side surface of the first condenser, and heat-exchanging the heat exchange medium with a heat-generating component; a second expansion valve disposed above the battery chiller, and expanding the heat exchange medium flowing thereinto from the second condenser; an internal heat exchanger disposed above the battery chiller and beside a side surface of the second expansion valve, and heat-exchanging the refrigerant discharged from the second condenser with a heat exchange medium discharged from an evaporator; an accumulator disposed below the battery chiller, storing the heat exchange medium flowing thereinto from the battery chiller, and supplying the heat exchange medium to the compressor; a first connection block coupled to the second expansion valve and the internal heat exchanger, connecting a heat exchange medium outlet of the second condenser and a heat exchange medium inlet of the second expansion valve to each other, and connecting the heat exchange medium outlet of the second condenser and a heat exchange medium input of the internal heat exchanger to each other; and a second connection block coupled to the second expansion valve and the battery chiller, connecting a heat exchange medium outlet of the second expansion valve and a heat exchange medium inlet of the battery chiller to each other, and connecting a heat exchange medium outlet of the battery chiller and a heat exchange medium inlet of the accumulator to each other.

The first condenser, the first expansion valve, the battery chiller, the second expansion valve, the internal heat exchanger, the accumulator, the first connection block, and the second connection block may be modularized and integrally formed.

All of a heat exchange medium outlet of the first condenser, the heat exchange medium inlet of the second expansion valve, and one heat exchange medium inlet and the other heat exchange medium outlet of the internal heat exchanger may be formed on the same side.

The refrigerant module may further include connection pipes connected to the first condenser, the first expansion valve, the battery chiller, the second expansion valve, and the internal heat exchanger, respectively, wherein the connection pipes are formed to extend in the same direction, such that end portions thereof are located within a specific region.

Advantageous Effects

The heat management system according to the present invention is advantageous in that a distance between components constituting a cooling system for cooling an indoor side of a vehicle and cooling an electronic component can be reduced to reduce a pressure loss of a refrigerant in a pipe and a block connecting the components to each other, thereby improving the performance of the system, and to improve assemblability between the components constituting the cooling system.

In addition, the heat management system according to the present invention is advantageous in that a path through which a heat exchange medium flows during heating is designed not to be bent as much as possible, thereby minimizing the pressure drop of the heat exchange medium and improving the performance of the system.

BEST MODE

Hereinafter, the heat management system having the configuration as described above according to the present invention will be described in detail with reference to the accompanying drawings.

Figure 1:
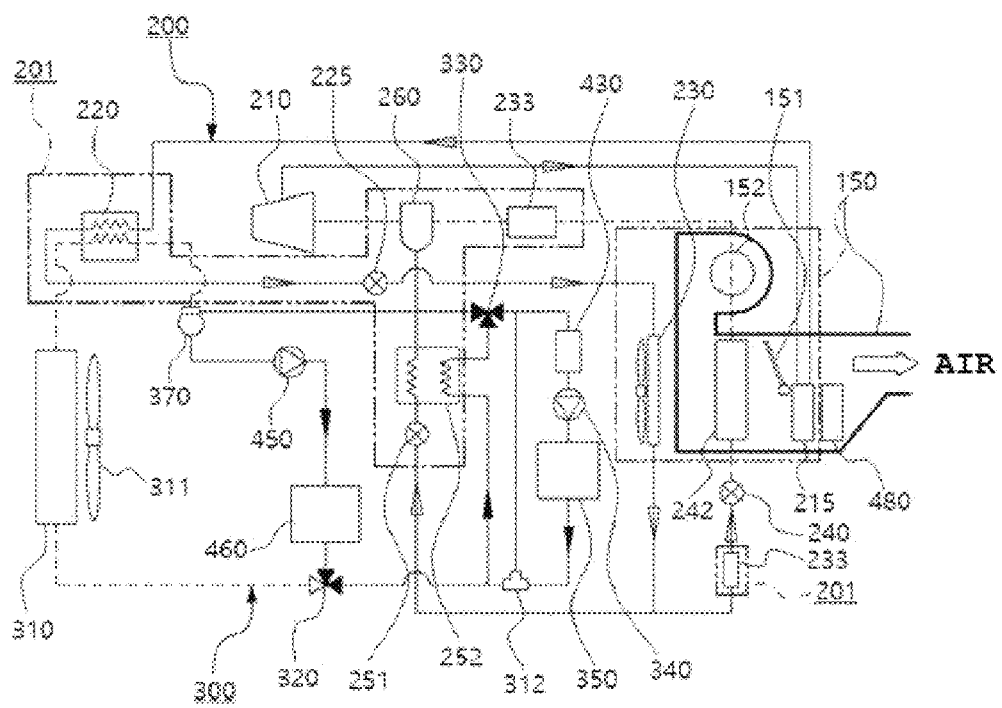
FIG. 1 is a configuration diagram illustrating a heating mode of a heat management system including a refrigerant system and a coolant system according to an embodiment of the present invention.
Figure 2:
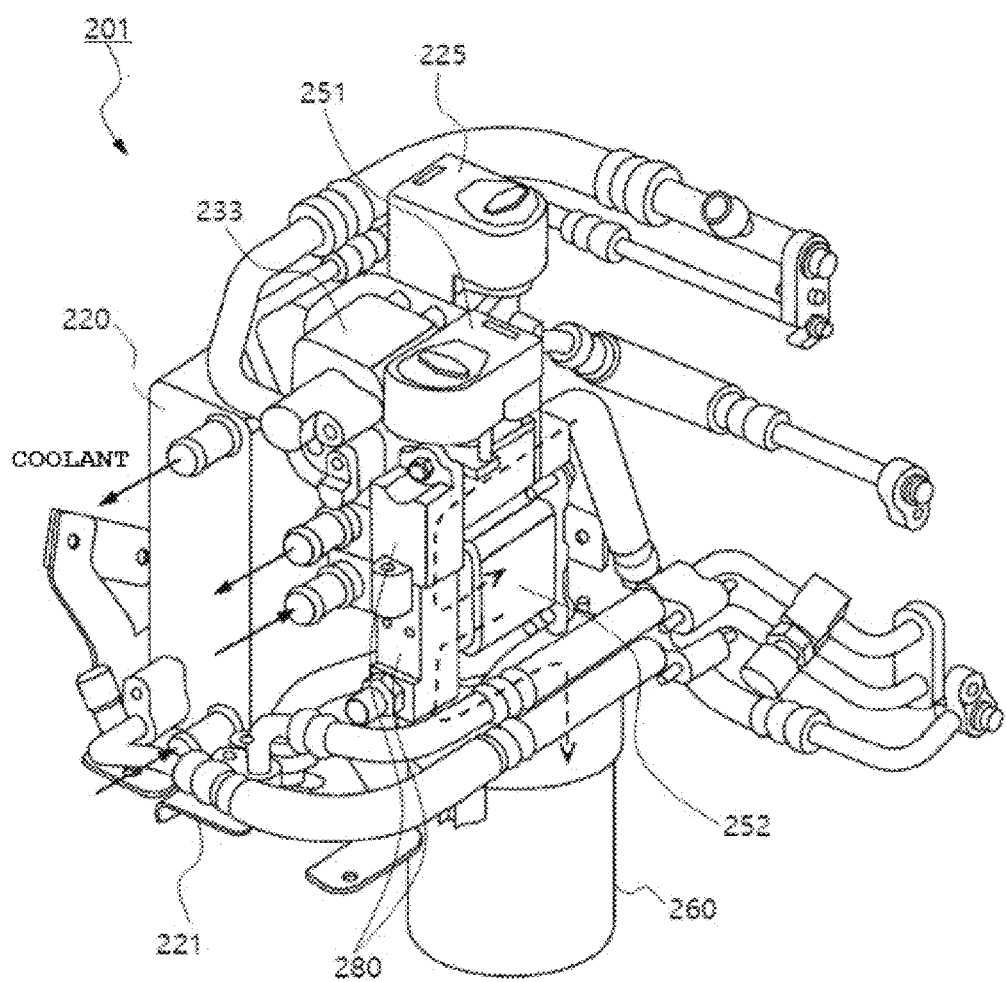
FIGS. 2 and 3 are front and rear perspective views each illustrating a refrigerant module of the heat management system according to an embodiment of the present invention.
Figure 3:
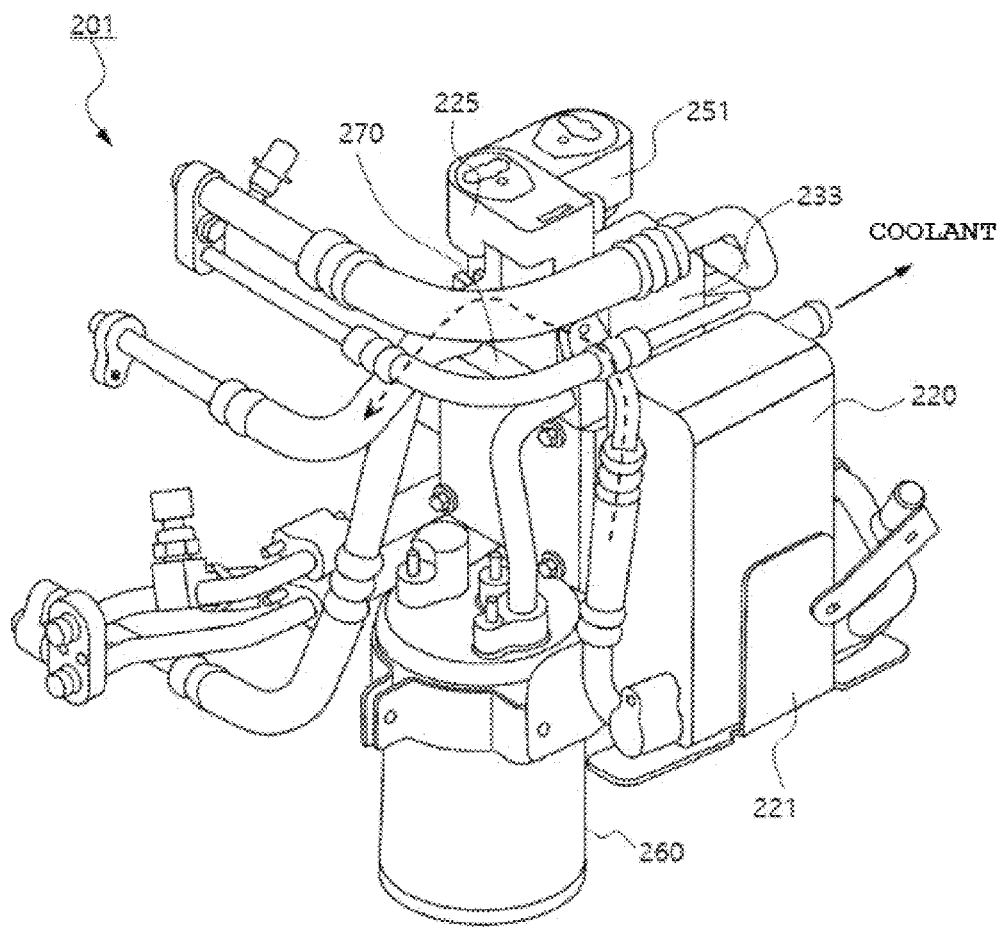
Figure 4:
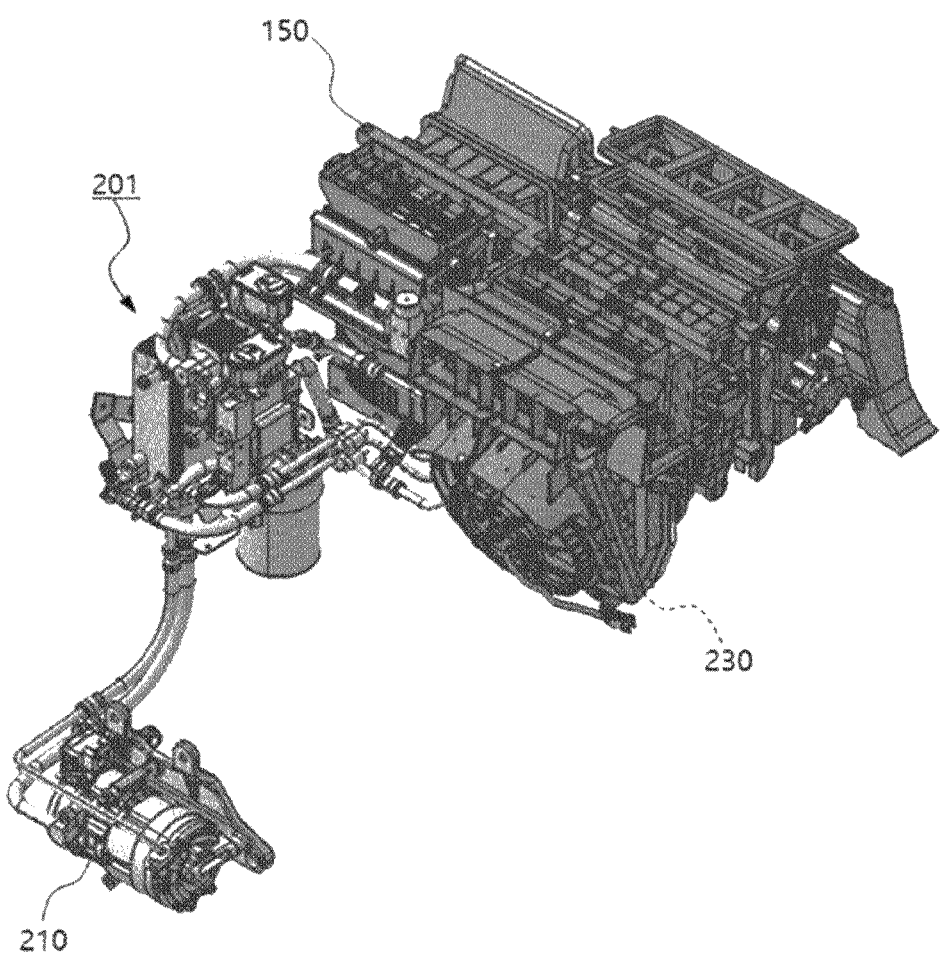
FIG. 4 is a perspective view illustrating the heat management system of FIG. 2 to which a compressor and an air conditioning device are added.

FIG. 1 is a configuration diagram illustrating a heating mode of a heat management system including a refrigerant system and a coolant system according to an embodiment of the present invention, FIGS. 2 and 3 are front and rear perspective views each illustrating a refrigerant module of the heat management system according to an embodiment of the present invention, and FIG. 4 is a perspective view illustrating the heat management system of FIG. 2 to which a compressor and an air conditioning device are added.

As illustrated, the heat management system according to the present invention may be a refrigerant system 200, and the heat management system according to the present invention may largely include a first heat exchanger, a first expansion valve, a second expansion valve, a second heat exchanger, an accumulator, and an internal heat exchanger. In addition, the heat management system according to the present invention may further include a condenser and an air conditioning device, and may further include a third expansion valve and an evaporator.

The first heat exchanger may be a first condenser, and the first condenser may be a water-cooled condenser 220. The water-cooled condenser 220 may serve to cool a refrigerant, which is a heat exchange medium introduced from a compressor 210, using a coolant. The water-cooled condenser 220 may be connected to a downstream side of the compressor 210 in a refrigerant flow direction. In addition, the condenser may be a second condenser, and the second condenser may be an air-cooled condenser 230. The air-cooled condenser 230 may serve to cool the refrigerant using external air, and the air-cooled condenser 230 may be connected to a downstream side of the water-cooled condenser 220 in the refrigerant flow direction. In addition, a first expansion valve 225 may be installed on a refrigerant flow path connecting a refrigerant outlet of the water-cooled condenser 220 and a refrigerant inlet of the air-cooled condenser 230 to each other. As a result, the refrigerant introduced from the compressor 210 into the water-cooled condenser 220 may exchange heat with the coolant in the water-cooled condenser 220, such that the refrigerant is cooled, thereby condensing the refrigerant into a liquid-phase refrigerant. Then, the refrigerant having passed through the water-cooled condenser 220 may be throttled and expanded while passing through the first expansion valve 225. In addition, the refrigerant having passed through the first expansion valve 225 may flow into the air-cooled condenser 230. In the air-cooled condenser 230, the refrigerant may exchange heat with external air, such that the refrigerant is further cooled. Here, the compressor 210 may be an electric compressor driven by receiving power, and serves to inhale and compress the refrigerant and discharge the compressed refrigerant toward the water-cooled condenser 220. In addition, the first expansion valve 225 may throttle and expand the refrigerant, bypass the refrigerant, or block the flow of the refrigerant, depending on how the first expansion valve 225 is operated. In addition, the air-cooled condenser 230 may serve as a condenser or an evaporator, and the function of the air-cooled condenser 230 may vary depending on what the first expansion valve 225 serves as. That is, in a case where the refrigerant system 200 is used as an air conditioner loop, the first expansion valve 225 is fully opened to allow the refrigerant to pass therethrough, and the air-cooled condenser 230 serves as a condenser together with the water-cooled condenser 220, such that the refrigerant cooled primarily while passing through the water-cooled condenser 220 may be further cooled secondarily while passing through the air-cooled condenser 230 thereafter. In addition, in a case where the refrigerant system 200 is used as a heat pump loop, the first expansion valve 225 throttles the refrigerant, and the air-cooled condenser 230 serves as an evaporator. The air-cooled condenser 230 may be cooled in an air-cooled manner or heated by outside air. In addition, the air-cooled condenser 230 may be mounted on an air conditioning device 150. The air conditioning device 150 is a device for cooling and heating an indoor side of a vehicle. A blower 152 is installed on one side of the air conditioning device 150 to blow air, and a temperature control door 151 may be installed inside the air conditioning device 150. In addition, an evaporator 242, an indoor unit 470, and a PTC heater 480, which is an air heating type heater, are mounted in the air conditioning device 150, and the air conditioning device 150 may be disposed and configured to allow the air discharged from the blower 152 to flow indoors after passing through only the evaporator 242, or to flow indoors after passing through the evaporator 242 and then passing through the indoor unit 470 and the PTC heater 480, depending on how the temperature control door 151 is operated. Here, the air conditioning device 150 may be installed over both the interior side and the outdoor side of the vehicle, the air-cooled condenser 230, the evaporator 242, and the indoor unit 470 may be disposed in an engine room, which is located on the outdoor side of the vehicle, and a cold air discharge port and a warm air discharge port of the air conditioning device 150 and the PTC heater 480 may be disposed on the indoor side of the vehicle.

A second expansion valve 251 may be connected to a downstream side of the air-cooled condenser 230 in the refrigerant flow direction. In addition, the second expansion valve 251 may throttle and expand the refrigerant flowing thereinto from the air-cooled condenser 230. At this time, the second expansion valve 251 may throttle and expand the refrigerant, bypass the refrigerant, or block the flow of the refrigerant, depending on how the second expansion valve 251 is operated.

The second heat exchanger may be a battery chiller 252, and the battery chiller 252 may be connected to a downstream side of the second expansion valve 251 in the refrigerant flow direction. In addition, the battery chiller 252 may heat-exchange the refrigerant flowing thereinto from the second expansion valve 251 with at least one of a battery 350 and an electrical component 460, which are heat-generating components.

An accumulator 260 serves to store the refrigerant flowing thereinto from the battery chiller 252 and supply the stored refrigerant to the compressor 210. A refrigerant inlet of the accumulator 260 may be connected to a downstream side of the battery chiller 252 in the refrigerant flow direction, and a refrigerant outlet of the accumulator 260 may be connected to the compressor 210. In addition, the accumulator 260 may separate refrigerants flowing thereinto into a liquid-phase refrigerant and a gas-phase refrigerant and supply only the gas-phase refrigerant to the compressor 210.

An internal heat exchanger 233 serves to exchange heat between the refrigerant discharged from the air-cooled condenser 230 and the refrigerant discharged from the evaporator 242 to improve cooling performance. Here, the internal heat exchanger 233 is configured to allow a refrigerant line connecting a first connection block 270 and a third expansion valve 240 to each other to pass therethrough, and allow a refrigerant line connecting the evaporator 242 and the accumulator 260 to each other to pass therethrough, such that heat may be exchanged between the refrigerant before flowing into the third expansion valve 240 and the refrigerant after passing through the evaporator 242 in the internal heat exchanger 233. As a result, the refrigerant can be further cooled by the internal heat exchanger 233 before flowing into the third expansion valve 240, and cooling performance can be improved through the evaporator 242, thereby improving the efficiency of the refrigerant system.

The third expansion valve 240 may serve to throttle the refrigerant, allowing the refrigerant to pass therethrough, or block the flow of the refrigerant. In addition, the third expansion valve 240 may be configured in parallel with the second expansion valve 251. That is, the third expansion valve 240 may be connected to one of the two refrigerant lines that diverge at the first connection block 270, and the second expansion valve 251 may be connected to the other one. In this case, the third expansion valve 240 may be disposed upstream of the evaporator 242 in the refrigerant flow direction, and the second expansion valve 251 may be disposed upstream of the battery chiller 252.

The evaporator 242 is disposed downstream of the third expansion valve 240 in the refrigerant flow direction, and is provided inside the air conditioning device 150 of the vehicle, such that air flowing by the blower 152 of the air conditioning device may be cooled while passing through the evaporator 242, and the cooled air may be supplied to the indoor side of the vehicle to be used for cooling the indoor side of the vehicle.

In this way, the third expansion valve 240 and the evaporator 242 may form one group, the second expansion valve 251 and the battery chiller 252 may form another group, and the two groups may be configured in parallel on the refrigerant line. In addition, the refrigerant lines formed downstream of the evaporator 242 and the battery chiller 252 in the refrigerant flow direction may be joined together to form one refrigerant line, and one refrigerant line may be connected to the accumulator 260.

In addition, the heat management system according to the present invention may further include an indoor unit 215.

The indoor unit 215 is connected between the compressor 210 and the water-cooled condenser 220, which is a first heat exchanger, and the indoor unit 215 may be disposed inside the air conditioning device 150. As a result, the indoor unit 215 may heat-exchange the refrigerant flowing thereinto from the compressor 210 with air to be supplied indoors and transfer the refrigerant to the water-cooled condenser 220, and the heat-exchanged air may be supplied to the indoor side of the vehicle for use in heating. In addition, the PTC heater 480 is disposed downstream of the indoor unit 215 in an air flow direction in the air conditioning device 150, such that the air of which a temperature has risen through the indoor unit 215 may be supplied indoors after being further heated through the PTC heater 480.

In addition, the heat management system according to an embodiment of the present invention may further include a coolant system 300. While the refrigerant system 200 described above is configured to circulate the refrigerant to cool or heat the indoor side of the vehicle, the coolant system 300 may be configured to circulate the coolant to cool heat-generating components. Here, the coolant system 300 may include an electrical radiator 310, a water-cooled condenser 220, a reservoir tank 370, a first coolant pump 450, an electrical component 460, a first direction switching valve 320, a battery chiller 252, a second direction switching valve 330, a bypass line 301, a coolant heater 430, a second coolant pump 340, a connection joint 312, and a battery 350.

The electrical radiator 310 is a radiator that cools the coolant heat-exchanged with the electrical component 460 or the battery 350, and the electrical radiator 310 may be cooled by a cooling fan 311 in an air-cooled manner. The refrigerant and the coolant may exchange heat while passing through the water-cooled condenser 220 as described above, and the water-cooled condenser 220 may be connected to a downstream side of the electrical radiator 310 in a coolant flow direction. The reservoir tank 370 may serve to store the coolant and supplement an insufficient coolant on a coolant line, and the reservoir tank 370 may be connected between the water-cooled condenser 220 and the first coolant pump 450 in the coolant flow direction. The first coolant pump 450 is a means for pumping the coolant so that the coolant circulates along the coolant line, and the first coolant pump 450 may be disposed downstream of the reservoir tank 370 in the coolant flow direction and installed on the coolant line. The electrical component 460 may be a driving motor, an inverter, an on-board charger (OBC), or the like, and may be installed in such a manner that the coolant line passes through the electrical component 460 to exchange heat between the electrical component 460 and the coolant. The first direction switching valve 320 may be connected to a downstream side of the electrical component 460 in the coolant flow direction, and the first direction switching valve 320 may be connected to the electrical radiator 310 and the connection joint 312 to serve to switch the coolant flow direction so that, after passing through the electrical component 460, the coolant flows toward the electrical radiator 310 or toward the connection joint 312. The refrigerant and the coolant may exchange heat while passing through the battery chiller 252 as described above, and the battery chiller 252 may be connected to a downstream side of the first direction switching valve 320 in the coolant flow direction. The second direction switching valve 330 may be connected to a downstream side of the battery chiller 252 in the coolant flow direction, and the second direction switching valve 330 may be connected adjacent to a branch point at which the reservoir tank 370, the bypass line 301, and an upstream side of the coolant heater 430 are jointed together. As a result, three coolant lines connected to the second direction switching valve 330 may be connected to or disconnected from each other depending on how the second direction switching valve 330 is operated. One end of the bypass line 301 may be connected to a coolant line connecting the second direction switching valve 330 and the coolant heater 430 to each other, and the other end of the bypass line 301 may be connected to the connection joint 312, such that the coolant is bypassed. The coolant heater 430 is a device for heating the coolant, and may be connected to a downstream side of the second direction switching valve 330 in the coolant flow direction. The second coolant pump 340 is a means for pumping the coolant so that the coolant circulates along the coolant line, and the second coolant pump 340 may be connected to a downstream side of the coolant heater 430 in the coolant flow direction and installed on the coolant line. The connection joint 312 is a part where three coolant lines meet and communicate with each other. One port of the connection joint 312 may be connected to a coolant line connecting the first direction switching valve 320 and the battery chiller 252 to each other, and another port of the connection joint 312 may be connected to the bypass line 301, and the other port of the connection joint 312 may be connected to a downstream coolant line of the battery 350. The battery 350 is a power source of the vehicle, and may be a driving source of the electrical component 460 in the vehicle. Alternatively, the battery 350 may serve to store electricity supplied from a fuel cell connected thereto, or serve to store electricity supplied from the outside. The battery 350 may be disposed on a coolant line between the second coolant pump 340 and the connection joint 312, and the battery 350 may be heated or cooled by exchanging heat with the coolant passing through the battery 350.

In addition, the blower 152 may be installed on one side of the air conditioning device 150 to blow air, and the temperature control door 151 may be installed inside the air conditioning device 150. In addition, the evaporator 242 and the indoor unit 215 disposed in the air conditioning device may be disposed and configured to allow the air discharged from the blower 152 to flow indoors after passing through only the evaporator 242, or to flow indoors after passing through the evaporator 242 and then passing through the indoor unit 215, depending on how the temperature control door 151 is operated.

<Heating Mode>

FIG. 1 is a configuration diagram illustrating a heating mode of a heat management system according to an embodiment of the present invention.

Referring to FIG. 1, when the heat management system according to an embodiment of the present invention operates in a heating (heat pump) mode, in the refrigerant system 200, a refrigerant compressed in the compressor 210 may exchange heat with air to be supplied indoors while passing through the indoor unit 215, such that the air is heated for use in heating. Then, after passing through the water-cooled condenser 220, the refrigerant throttled and expanded in the first expansion valve 225 is evaporated while passing through the air-cooled condenser 230, such that the refrigerant absorbs external heat by exchanging heat with external air. Then, after bypassing the second expansion valve 251, the refrigerant absorbs heat from the coolant by exchanging heat while passing through the battery chiller 252. Then, the refrigerant is collected in the accumulator 260 and flows back into the compressor 210. By repeating the above-described process, heating is performed. At this time, the third expansion valve 240 is closed, and the refrigerant does not flow toward the evaporator 242 and the internal heat exchanger 233.

In the coolant system 300, a coolant flowing from the reservoir tank 370 may be pumped by the first coolant pump 450, and the coolant may absorb heat from the electrical component 460 by exchanging heat while passing through the electrical component 460. Then, after passing through the first direction switching valve 320, the coolant may exchange heat while passing through the battery chiller 252, such that the refrigerant absorbs heat from the coolant. Thereafter, the coolant may flow into the reservoir tank 370 via the second direction switching valve 330. In addition, the coolant pumped by the second coolant pump 340 absorbs heat from the battery 350 by exchanging heat while passing through the battery 350, and then the refrigerant may absorb the heat from the coolant by exchanging heat while the coolant passes through the battery chiller 252. Thereafter, the coolant may flow into the reservoir tank 370 via the second direction switching valve 330. Here, the coolant heater 430 may operate to heat the coolant, and the coolant heated by the coolant heater 430 may heat the battery 350 while passing through the battery 350. In addition, the coolant may not flow from a coolant line connected to a left side of the first direction switching valve 320 to the electrical radiator 310 and the water-cooled condenser 220.

<Cooling and Battery Cooling Mode>

Figure 5:
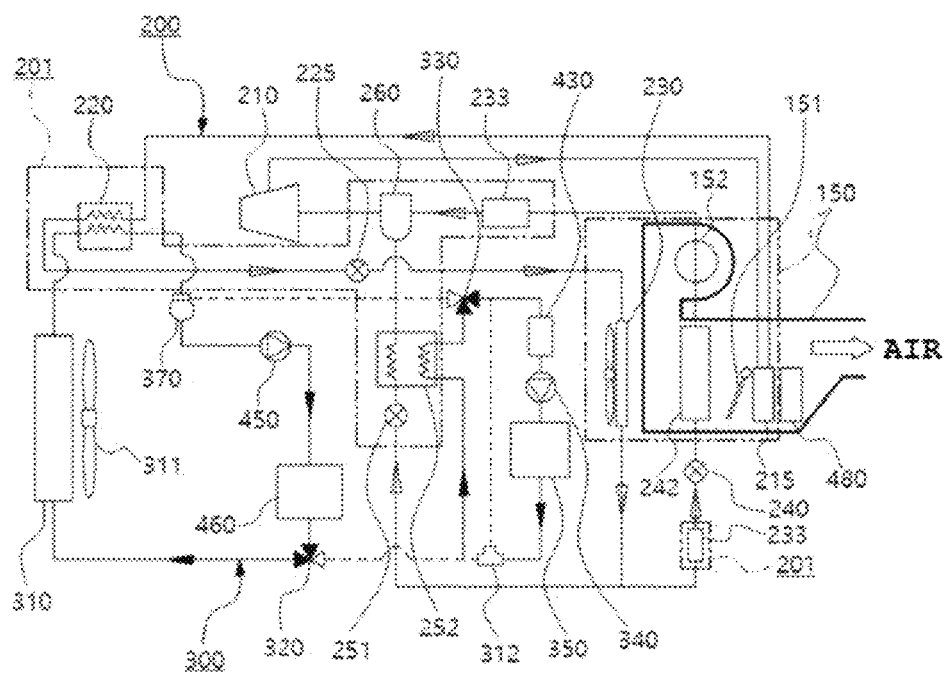
FIG. 5 is a configuration diagram illustrating a cooling and battery cooling mode of a heat management system including a refrigerant system and a coolant system according to an embodiment of the present invention.

FIG. 5 is a configuration diagram illustrating a cooling and battery cooling mode of a heat management system according to an embodiment of the present invention.

Referring to FIG. 5, when the heat management system according to an embodiment of the present invention operates in a cooling (air conditioner) and battery cooling mode, in the refrigerant system 200, a refrigerant compressed in the compressor 210 is condensed by exchanging heat with the coolant while passing through the water-cooled condenser 220 after passing through the indoor unit, and then the refrigerant is further cooled and condensed while passing through the air-cooled condenser 230 after bypassing the first expansion valve 225. Thereafter, the refrigerant may branch, and some of the refrigerant may be throttled and expanded while passing through the third expansion valve 240, and then exchange heat with air to be supplied indoors in the evaporator 242, such that the cooled air may be used for cooling. The refrigerant discharged from the evaporator 242 flows into the accumulator 260. At this time, the refrigerant before flowing into the third expansion valve 240 and the refrigerant after passing through the evaporator 242 may exchange heat with each other in the internal heat exchanger 233. In addition, the other of the refrigerant discharged and diverging from the air-cooled condenser 230 may be throttled and expanded while passing through the second expansion valve 251, and then exchange heat with the coolant in the battery chiller 252 to cool the coolant. The refrigerant having passed through the battery chiller 252 flows into the accumulator 260. The refrigerant collected in the accumulator 260 is supplied back to the compressor 210. By repeating the above-described process, cooling is performed.

In the coolant system 300, the coolant may cool the electrical component 460 after passing through the first coolant pump 450 from the reservoir tank 370. Then, after passing through the first direction switching valve 320, the coolant is cooled by exchanging heat with external air in the electrical radiator 310, and then exchanges heat with the refrigerant in the water-cooled condenser 220 to cool the refrigerant. The coolant discharged from the water-cooled condenser 220 is collected in the reservoir tank 370, and the above-described process is repeated. In addition, on the battery side, after the coolant pumped by the second coolant pump 340 cools the battery while passing through the battery 350, the coolant may be cooled by exchanging heat with the refrigerant in the battery chiller 252. Then, after passing through the second direction switching valve 330 and the coolant heater 430 in turn, the coolant may flow and circulate into the second coolant pump 340. At this time, the first direction switching valve 320 and the second direction switching valve 330 may be operated to prevent the coolant from flowing through a coolant line connected to a right side of the first direction switching valve 320, and prevent the coolant from flowing through a coolant line connected to a left side of the second direction switching valve 330.

Hereinafter, the above-described configuration of the refrigerant module in the refrigerant system of the heat management system according to an embodiment of the present invention will be described in more detail.

Figure 6:
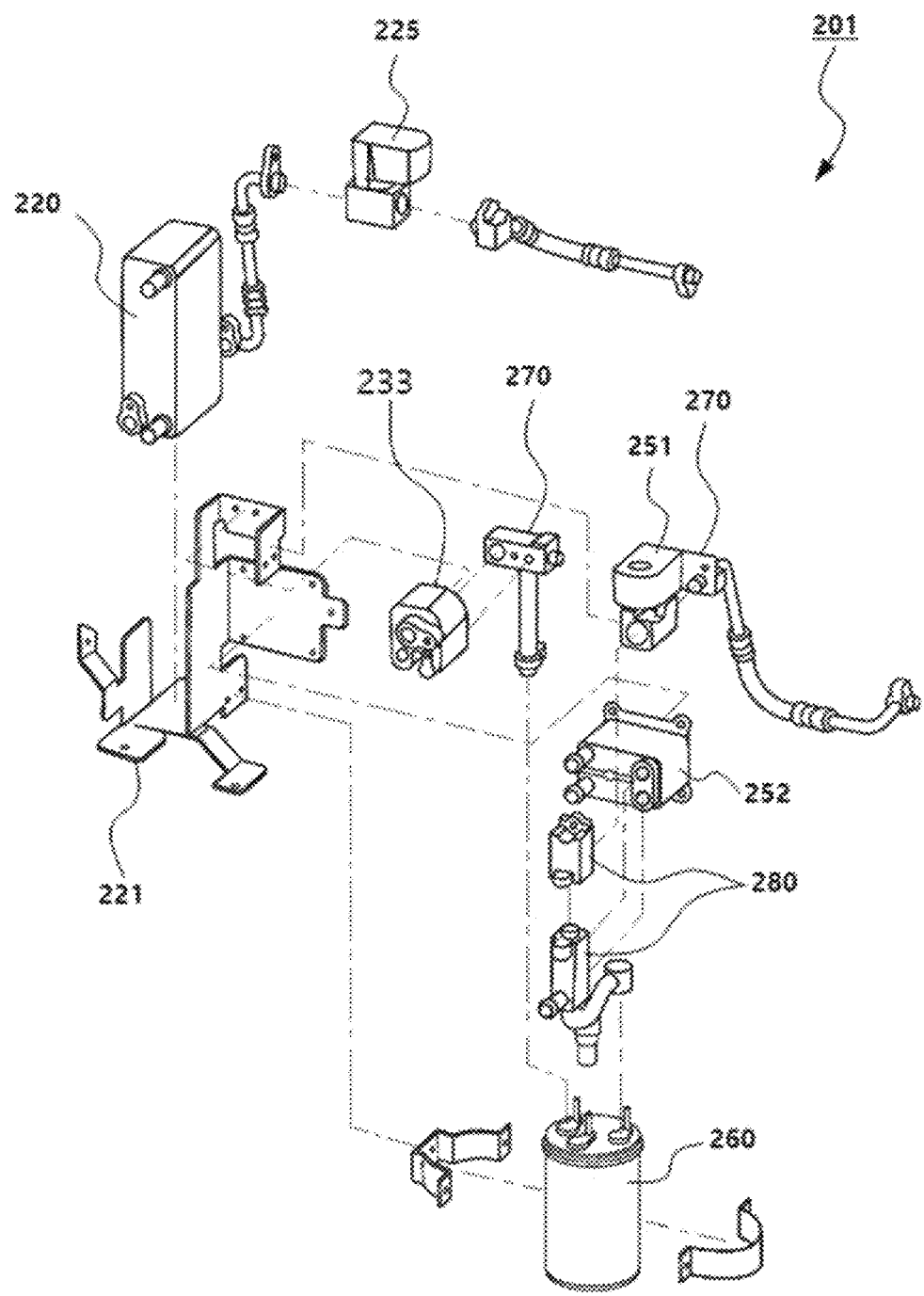
FIG. 6 is an exploded perspective view illustrating a refrigerant module of the heat management system according to an embodiment of the present invention.
Figure 7:
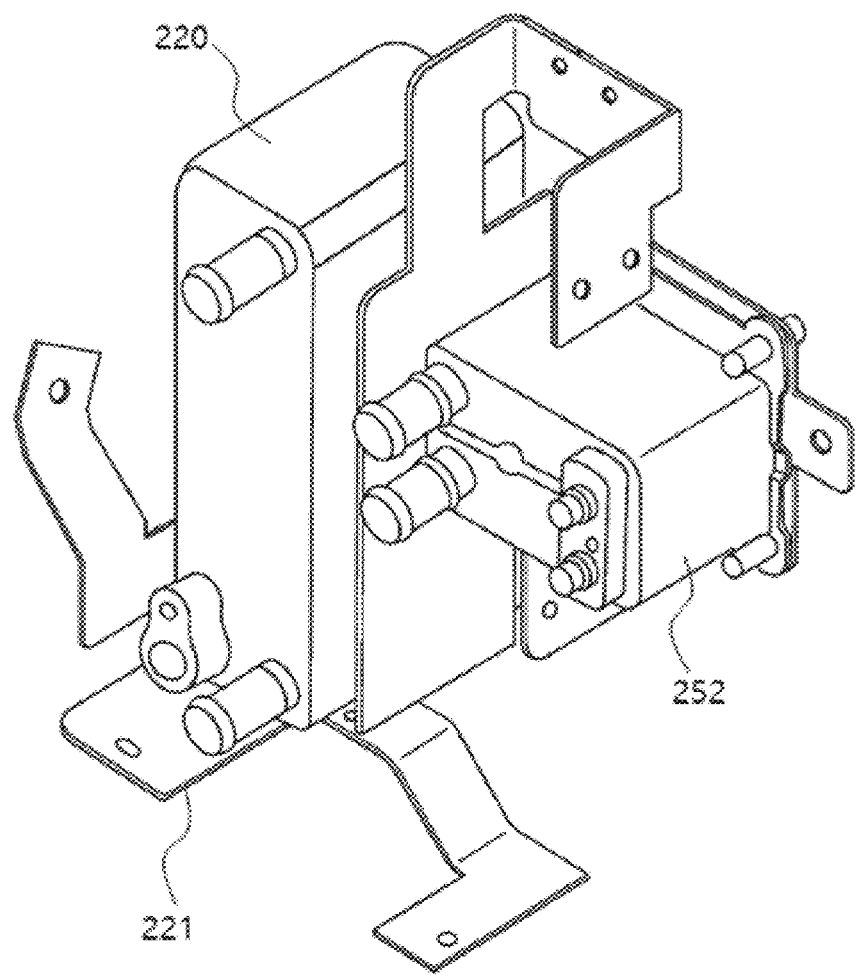
FIGS. 7 to 11 are perspective views each illustrating a state in which components are assembled according to an assembly sequence of the refrigerant module of the heat management system according to an embodiment of the present invention.
Figure 8:
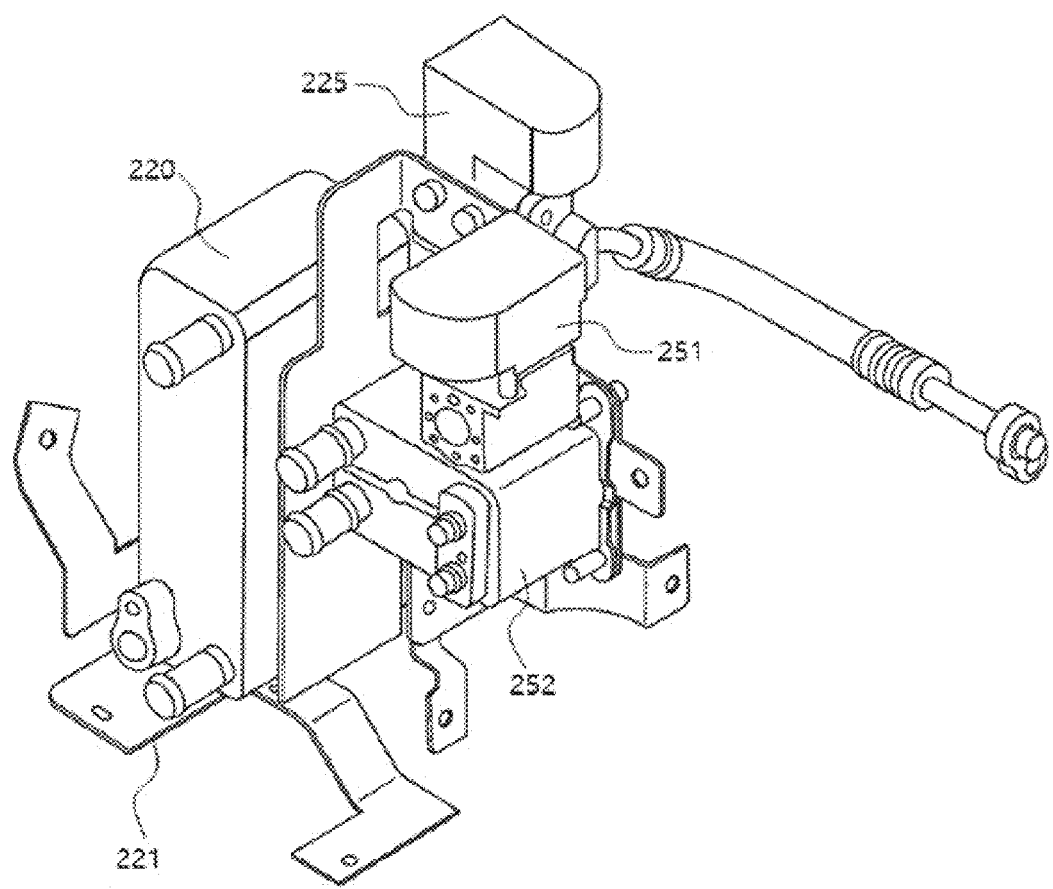
Figure 9:
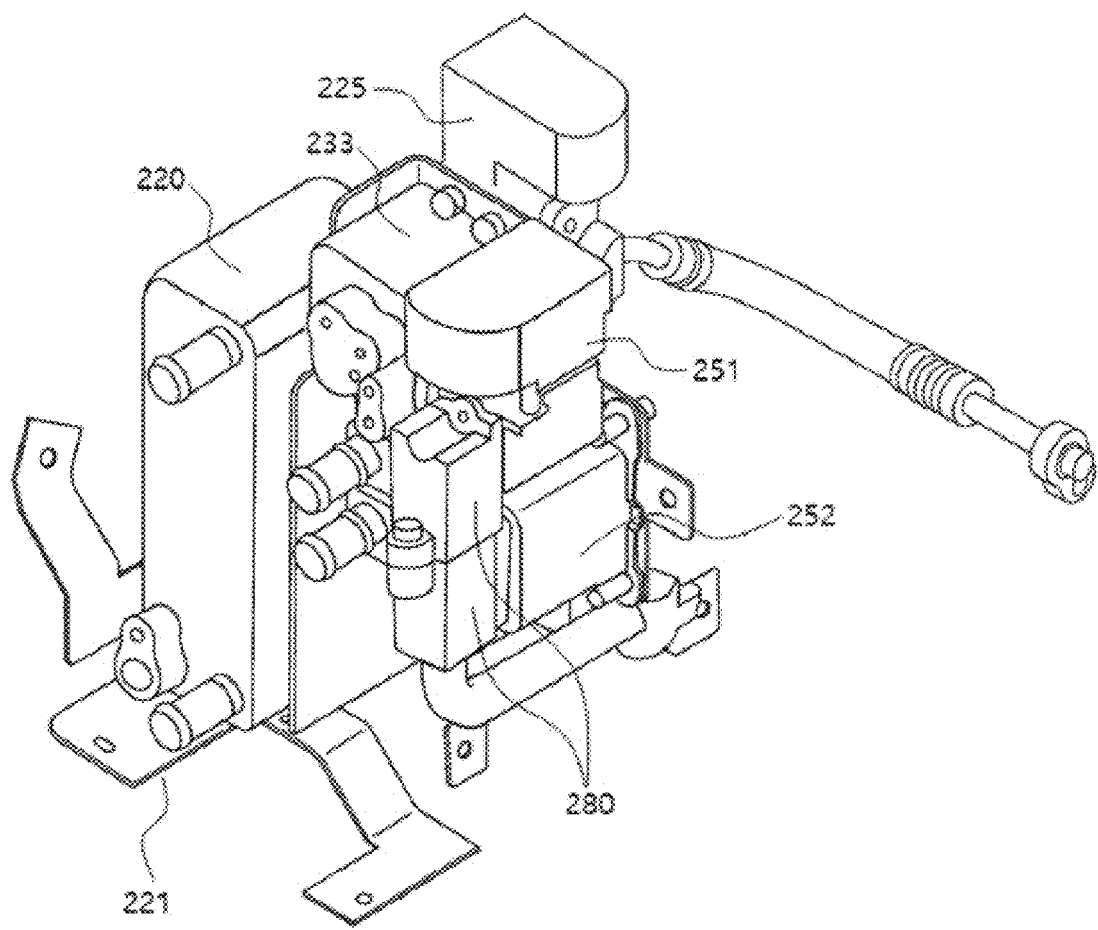
Figure 10:
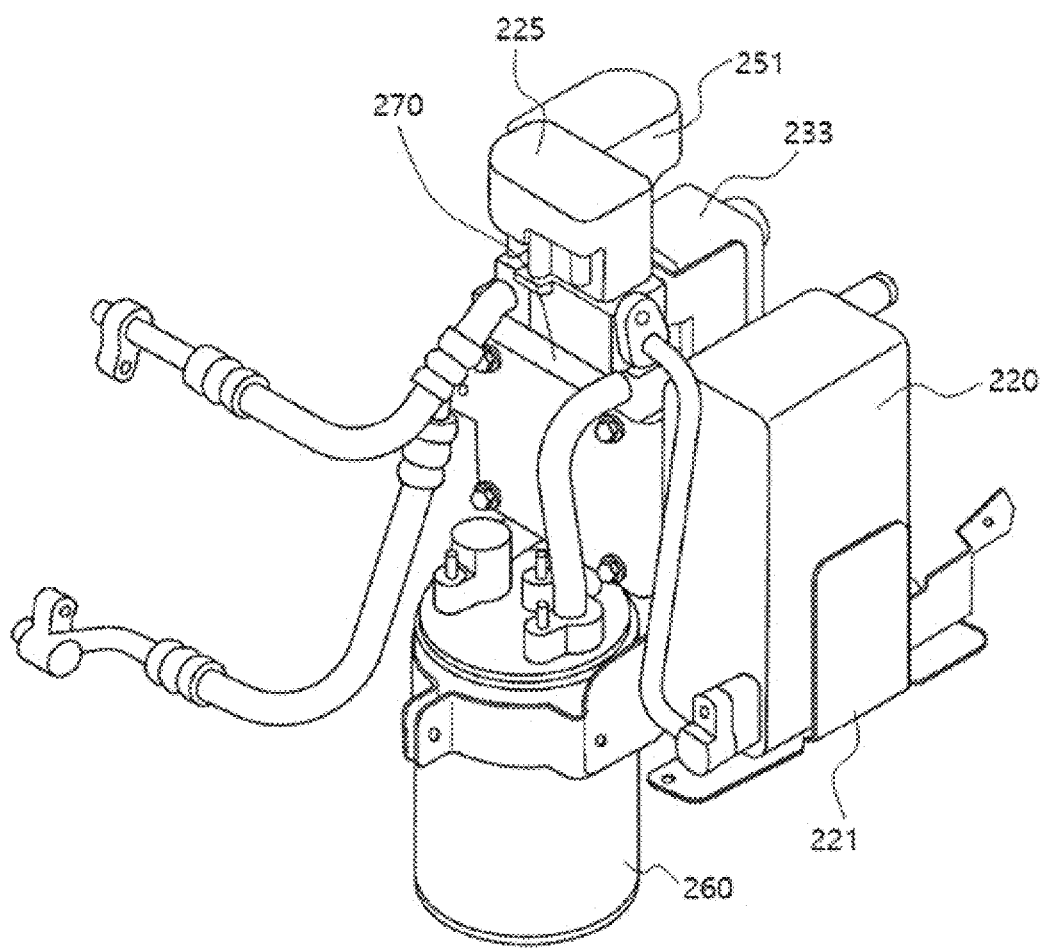
Figure 11:
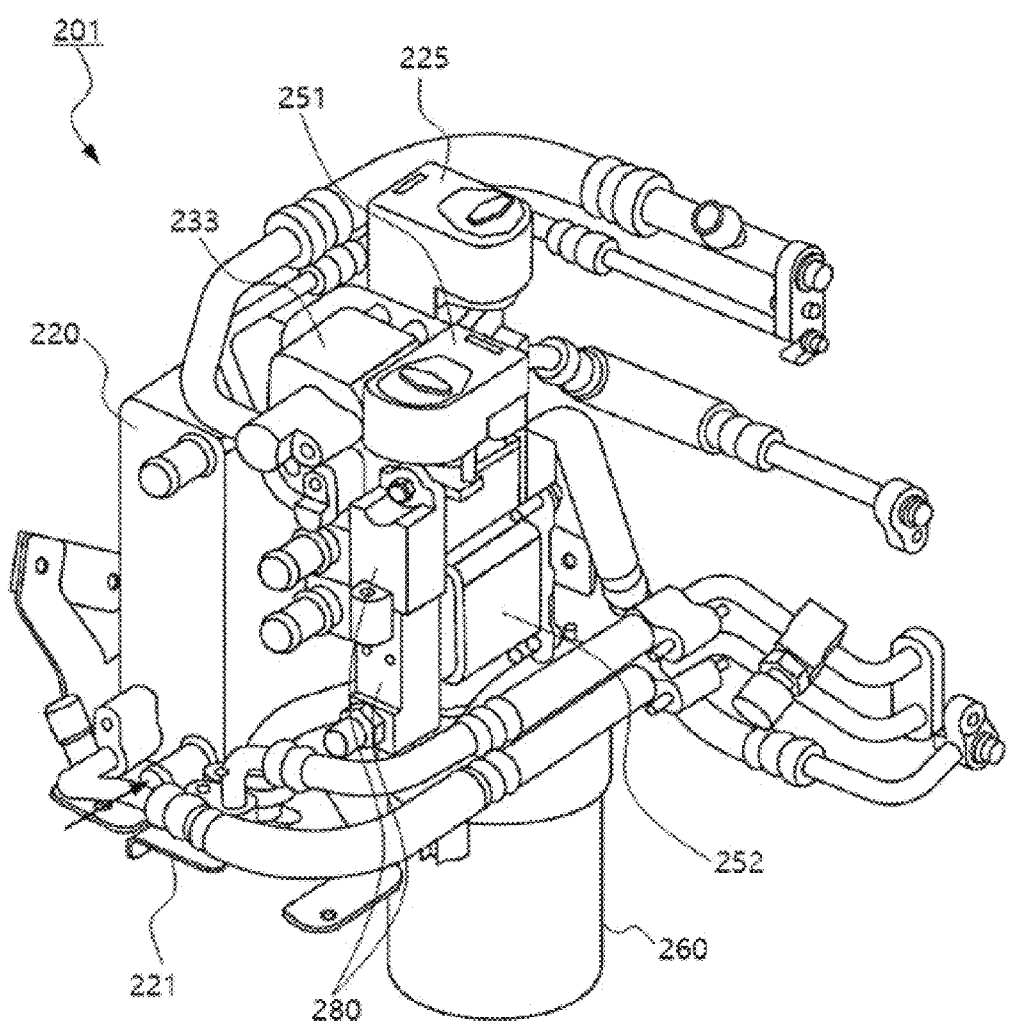

FIG. 6 is an exploded perspective view illustrating the refrigerant module of the heat management system according to an embodiment of the present invention, and FIGS. 7 to 11 are perspective views each illustrating a state in which components are assembled according to an assembly sequence of the refrigerant module of the heat management system according to an embodiment of the present invention.

As illustrated, in the refrigerant system of the heat management system according to an embodiment of the present invention, the refrigerant module 201 may include a water-cooled condenser 220, a first expansion valve 225, a second expansion valve 251, a battery chiller 252, an accumulator 260, and an internal heat exchanger 233, may further include a first connection block 270 and a second connection block 280, and may further include connection pipes connected to the above-described components and a third expansion valve 240.

The water-cooled condenser 220 may be formed in a rectangular parallelepiped shape to be vertically long with relatively long sides being formed in a height direction, and may be coupled to a fixing bracket 221. In addition, the water-cooled condenser 220 may have a refrigerant inlet formed at a lower portion of a left side surface in the longitudinal direction and a refrigerant outlet formed at a lower portion of a right side surface in the longitudinal direction. Also, the water-cooled condenser 220 may have a coolant inlet and a coolant outlet formed on the left side surface in the longitudinal direction. Alternatively, the coolant inlet and the coolant outlet may be formed at various other positions.

The first expansion valve 225 may be disposed at a height above the water-cooled condenser 220, and the first expansion valve 225 may be coupled to an uppermost side of the fixing bracket 221. Also, a refrigerant inlet of the first expansion valve 225 may be connected to the refrigerant outlet of the water-cooled condenser 220 through a connection pipe.

The second expansion valve 251 and the internal heat exchanger 233 may be disposed at a height corresponding to an upper side of the water-cooled condenser 220, and the battery chiller 252 may be disposed at a height corresponding to a middle height of the water-cooled condenser 220. At this time, the second expansion valve 251, the internal heat exchanger 233, and the battery chiller 252 may be disposed beside a side surface of the water-cooled condenser 220 on which none of the refrigerant inlet, the refrigerant outlet, the coolant inlet, and the coolant outlet are formed (e.g., beside a front surface of the water-cooled condenser in the width direction). In addition, the battery chiller 252 may be disposed below the second expansion valve 251 and the internal heat exchanger 233 in the height direction, and the accumulator 260 may be disposed below the battery chiller 252 in the height direction. In addition, the second expansion valve 251, the internal heat exchanger 233, the battery chiller 252, and the accumulator 260 may be coupled to and fixed to the fixing bracket 221.

The first connection block 270 may be coupled to right sides of the second expansion valve 251 and the internal heat exchanger 233 in the longitudinal direction, a connection pipe may be coupled to a refrigerant inlet of the first connection block 270, a refrigerant outlet of the first connection block 270 may be connected to the accumulator 260 through a connection pipe. In addition, the second connection block 280 may be coupled to left sides of the second expansion valve 251 and the battery chiller 252 in the longitudinal direction, and a refrigerant outlet of the second connection block 280 may be connected to the accumulator 260 through a connection pipe.

In addition, respective connection pipes may be connected to a refrigerant inlet and a refrigerant outlet formed on a left side surface of the internal heat exchanger 233 in the longitudinal direction, and the third expansion valve 240 may be installed at an end portion of the connection pipe extending from each of the refrigerant inlet and the refrigerant outlet of the internal heat exchanger 233.

Here, the connection pipe may be formed in any of various types, such as a metal pipe or a flexible hose.

As a result, the water-cooled condenser 220, which is a first heat exchanger, the first expansion valve 225, the second expansion valve 251, the battery chiller 252, which is a second heat exchanger, the accumulator 260, and the internal heat exchanger 233 may be compactly modularized and integrally formed.

At this time, a refrigerant inlet of the second expansion valve 251 and one refrigerant inlet of the internal heat exchanger 233 may be connected to each other by the first connection block 270 for communication therebetween, and a refrigerant inlet connected to a refrigerant outlet of the air-cooled condenser 230 may be formed in the first connection block 270. As a result, the refrigerant flowing from the air-cooled condenser 230 branches at the first connection block 270, so that some of the refrigerant may be transferred to the second expansion valve 251 and the other of the refrigerant may be transferred to the internal heat exchanger 233. In addition, a pair of refrigerant outlets of the first connection block 270 may be located at the same height. That is, the refrigerant inlet of the second expansion valve 251 and one refrigerant inlet of the internal heat exchanger 233 may be located at the same height and coupled to and connected to the first connection block 270. Thus, the refrigerant may flow from the first connection block 270 to the second expansion valve 251 and the internal heat exchanger 233 uniformly.

In addition, a refrigerant outlet of the second expansion valve 251 and a refrigerant inlet of the battery chiller 252 may be connected to each other by the second connection block 280, and a refrigerant outlet connected to the refrigerant inlet of the accumulator 260 may be formed in the second connection block 280. As a result, the refrigerant flowing from the second expansion valve 251 may flow into the battery chiller 252 through the second connection block 280, and the refrigerant having passed through the battery chiller 252 may be transferred to the accumulator 260 through the second connection block 280 again. At this time, the second expansion valve 251 and the internal heat exchanger 233 may be disposed above the battery chiller 252 in the height direction, the accumulator 260 may be disposed below the battery chiller 252 in the height direction, and the refrigerant inlet of the battery chiller 252 may be formed to be relatively higher than the refrigerant outlet of the battery chiller 252 in the height direction. Therefore, since the overall flow of the refrigerant is directed downward (in the direction of gravity) in the height direction, the pressure loss of the refrigerant can be reduced.

In addition, the second connection block 280 may be disposed opposite to the first connection block 270 based on the second expansion valve 251, and a flow path may be formed in a straight line from the refrigerant inlet of the first connection block 270 connected to the air-cooled condenser 230 to a refrigerant inlet of the second connection block 280 connected to the second expansion valve 251. That is, the flow path of the refrigerant discharged from the air-cooled condenser 230 and flowing into the battery chiller 252 is formed in a structure that is not bent as much as possible, which is advantageous in that the pressure drop of the heat exchange medium is minimized, thereby improving the performance of the system.

In addition, all of the refrigerant outlet of the water-cooled condenser 220, the refrigerant inlet of the second expansion valve 251, one refrigerant inlet, and the other refrigerant outlet of the internal heat exchanger 233 may be formed on the same side. In addition, all of the connection pipes connected to the water-cooled condenser 220, the first expansion valve 225, the second expansion valve 251, the battery chiller 252, and the internal heat exchanger 233, respectively, may extend in the same direction, and end portions of the connection pipes may be located within a specific region. Here, the above-described specific region may be a region adjacent to the air conditioning device 150, and the end portions of the connection pipes may be portions connected to the refrigerant inlets and the refrigerant outlets of the evaporator 242, the air-cooled condenser 230, and the indoor unit 215 mounted on the air conditioning device 150, respectively. As a result, the lengths of the connection pipes can be reduced, and the pressure drop of the refrigerant can be minimized, thereby improving the performance of the system. In addition, the compressor 210 may be disposed at any of various positions, and pipes connected thereto may be formed in various ways depending on where the compressor 210 is positioned.

In addition, the assembly sequence of the refrigerant module 201 will be described. First, the water-cooled condenser 220 and the battery chiller 252 are installed on the fixing bracket 221, and then the first expansion valve 225 is installed on the fixing bracket 221. In this case, connection pipes may be assembled on the refrigerant inlet and the refrigerant outlet of the first expansion valve 225 before or after the first expansion valve 225 is installed. Then, the second expansion valve 251 may be mounted on the fixing bracket 221, and the second connection block 280 may be coupled to the second expansion valve 251 and the battery chiller 252 to connect the refrigerant outlet of the second expansion valve 251 and the refrigerant inlet of the battery chiller 252 to each other. In addition, a pipe connected to the accumulator 260 may be assembled on the refrigerant outlet of the second connection block 280. Thereafter, the internal heat exchanger 233 is mounted on the fixing bracket 221, and the first connection block 270 and connection pipes are assembled to be connected to one refrigerant inlet and the other refrigerant outlet of the internal heat exchanger 233. At this time, the first connection block 270 may be coupled to the second expansion valve 251 and the internal heat exchanger 233, and the refrigerant inlet of the first connection block 270, the refrigerant inlet of the second expansion valve 251, and one refrigerant inlet of the internal heat exchanger 233 may be connected to each other by the first connection block 270. In addition, a refrigerant discharge passage connected to the other refrigerant outlet of the internal heat exchanger 233 may be formed in the first connection block 270, and a connection pipe connected to the accumulator 260 may be assembled on the refrigerant discharge passage of the first connection block 270. Then, after a connection pipe for transferring the refrigerant to a refrigerant inhalation side of the compressor 210 is assembled on the accumulator 260, the accumulator 260 is mounted on the fixing bracket 221. Thereafter, connection pipes connecting the compressor 210, the indoor unit 215, and the water-cooled condenser 220 may be assembled, connection pipes connected to one refrigerant outlet and the other refrigerant inlet of the internal heat exchanger 233 may be assembled, and the third expansion valve 240 may be mounted at the end portions of these connection pipes. Also, the refrigerant module 201 may be assembled in any one of various other ways and in any of various other sequences.

The present invention is not limited to the above-described embodiment, and may be applied in various forms. Various modifications may be made by any person having ordinary knowledge in the art to which the present invention pertains without departing from the gist of the present invention claimed in the claims.

DESCRIPTION OF REFERENCE NUMERALS

150: air conditioning device, 151: temperature control door, 152: blower
200: refrigerant system, 201: refrigerant module, 210: compressor
215: indoor unit, 220: water-cooled condenser, 221: fixing bracket
225: first expansion valve, 230: air-cooled condenser, 233: internal heat exchanger
240: third expansion valve, 242: evaporator, 251: second expansion valve
252: battery chiller, 260: accumulator, 270: first connection block
280: second connection block, 300: coolant system, 301: bypass line
310: electrical radiator, 311: cooling fan, 312: connection joint
320: first direction switching valve, 330: second direction switching valve
340: second coolant pump, 350: battery, 370: reservoir tank
430: coolant heater, 450: first coolant pump, 460: electrical component
480: PTC heater

The invention claimed is:

1. A heat management system comprising:
a first heat exchanger heat-exchanging a heat exchange medium flowing thereinto from a compressor;
a first expansion valve expanding the heat exchange medium flowing thereinto from the first heat exchanger and transferring the expanded heat exchange medium to a condenser;
a second expansion valve expanding the heat exchange medium flowing thereinto from the condenser;
a second heat exchanger heat-exchanging the heat exchange medium flowing thereinto from the second expansion valve with a heat-generating component;
an accumulator storing the heat exchange medium flowing thereinto from the second heat exchanger and supplying the heat exchange medium to the compressor;
an internal heat exchanger heat-exchanging the heat exchange medium discharged from the condenser with a heat exchange medium discharged from an evaporator, and
a first connection block connecting a heat exchange medium outlet of the condenser and a heat exchange medium inlet of the second expansion valve to each other, and connecting the heat exchange medium outlet of the condenser and a heat exchange medium inlet of the internal heat exchanger to each other.

2. The heat management system of claim 1, wherein the heat-generating component includes a battery or an electronic component, and
the second heat exchanger cools or heats the heat-generating component.

3. The heat management system of claim 1, wherein the first heat exchanger, the first expansion valve, the second expansion valve, the second heat exchanger, the accumulator, and the internal heat exchanger are modularized and integrally formed.

4. The heat management system of claim 1, wherein the second expansion valve and the internal heat exchanger are disposed above the second heat exchanger in a height direction.

5. The heat management system of claim 4, wherein the accumulator is disposed below the second heat exchanger in the height direction.

6. The heat management system of claim 5, wherein the second heat exchanger has a heat exchange medium inlet formed at an upper portion thereof in the height direction, and a heat exchange medium outlet formed at a lower portion thereof in the height direction.

7. The heat management system of claim 1, further comprising a second connection block connecting a heat exchange medium outlet of the second expansion valve and a heat exchange medium inlet of the second heat exchanger to each other, and connecting a heat exchange medium outlet of the second heat exchanger and a heat exchange medium inlet of the accumulator to each other.

8. The heat management system of claim 7, wherein the second connection block is disposed opposite to the first connection block based on the second expansion valve, and
a flow path from a heat exchange medium inlet of the first connection block connected to the condenser to a heat exchange medium inlet of the second connection block connected to the second expansion valve is formed in a straight line.

9. The heat management system of claim 1, wherein a pair of heat exchange medium outlets of the first connection block are located at the same height.

10. The heat management system of claim 1, wherein all of a heat exchange medium outlet of the first heat exchanger, a heat exchange medium inlet of the second expansion valve, and one heat exchange medium inlet and the other heat exchange medium outlet of the internal heat exchanger are formed on a same side of the internal heat exchanger.

11. The heat management system of claim 10, further comprising connection pipes connected to the first heat exchanger, the first expansion valve, the second expansion valve, the second heat exchanger, and the internal heat exchanger, respectively,
wherein the connection pipes are formed to extend in the same direction, such that end portions thereof are located within a region adjacent to the air conditioning device equipped with the condenser, the evaporator, and an indoor unit.

12. The heat management system of claim 1, further comprising:
the condenser cooling the heat exchange medium flowing thereinto from the first expansion valve by exchanging heat with air and transferring the cooled heat exchange medium to the second expansion valve; and
an air conditioning device cooling and heating an indoor side,
wherein the condenser is an air-cooled condenser, and the air-cooled condenser is mounted on the air conditioning device.

13. The heat management system of claim 1, further comprising:
a third expansion valve expanding the heat exchange medium flowing thereinto from the condenser; and
the evaporator heat-exchanging the heat exchange medium flowing thereinto from the third expansion valve with air to be supplied indoors, and then transferring the heat exchange medium to the accumulator.

14. The heat management system of claim 1, further comprising an indoor unit connected between the compressor and the first heat exchanger, and heat-exchanging the heat exchange medium flowing thereinto from the compressor with air to be supplied indoors and then transferring the heat exchange medium to the first heat exchanger.

15. A refrigerant module comprising:
a first condenser heat-exchanging a heat exchange medium flowing thereinto from a compressor;
a first expansion valve disposed beside a side surface of the first condenser, and expanding the heat exchange medium flowing thereinto from the first condenser and transferring the expanded heat exchange medium to a second condenser;
a battery chiller disposed beside a side surface of the first condenser, and heat-exchanging the heat exchange medium with a heat-generating component;
a second expansion valve disposed above the battery chiller, and expanding the heat exchange medium flowing thereinto from the second condenser;
an internal heat exchanger disposed above the battery chiller and beside a side surface of the second expansion valve, and heat-exchanging the heat exchange medium discharged from the second condenser with a heat exchange medium discharged from an evaporator;
an accumulator disposed below the battery chiller, storing the heat exchange medium flowing thereinto from the battery chiller, and supplying the heat exchange medium to the compressor;
a first connection block coupled to the second expansion valve and the internal heat exchanger, connecting a heat exchange medium outlet of the second condenser and a heat exchange medium inlet of the second expansion valve to each other, and connecting the heat exchange medium outlet of the second condenser and a heat exchange medium input of the internal heat exchanger to each other; and
a second connection block coupled to the second expansion valve and the battery chiller, connecting a heat exchange medium outlet of the second expansion valve and a heat exchange medium inlet of the battery chiller to each other, and connecting a heat exchange medium outlet of the battery chiller and a heat exchange medium inlet of the accumulator to each other.

16. The refrigerant module of claim 15, wherein the first condenser, the first expansion valve, the battery chiller, the second expansion valve, the internal heat exchanger, the accumulator, the first connection block, and the second connection block are modularized and integrally formed.

17. The refrigerant module of claim 15, wherein all of a heat exchange medium outlet of the first condenser, the heat exchange medium inlet of the second expansion valve, and one heat exchange medium inlet and the other heat exchange medium outlet of the internal heat exchanger are formed on a same side of the internal heat exchanger.

18. The refrigerant module of claim 17, further comprising connection pipes connected to the first condenser, the first expansion valve, the battery chiller, the second expansion valve, and the internal heat exchanger, respectively,
wherein the connection pipes are formed to extend in the same direction, such that end portions thereof are located within a region adjacent to the air conditioning device equipped with the condenser, the evaporator, and an indoor unit.

\* \* \* \* \*